United States Patent
Yao et al.

(10) Patent No.: US 11,105,979 B2
(45) Date of Patent: Aug. 31, 2021

(54) GRAPHENE MICROCAVITY FREQUENCY COMBS AND RELATED METHODS OF MANUFACTURING

(71) Applicant: The Regents of the University of California, Oakland, CA (US)

(72) Inventors: Baicheng Yao, Los Angeles, CA (US); Shu-Wei Huang, Los Angeles, CA (US); Chee Wei Wong, Los Angeles, CA (US); Abhinav Kumar Vinod, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/643,835

(22) PCT Filed: Aug. 30, 2018

(86) PCT No.: PCT/US2018/048954
§ 371 (c)(1),
(2) Date: Mar. 2, 2020

(87) PCT Pub. No.: WO2019/046645
PCT Pub. Date: Mar. 7, 2019

(65) Prior Publication Data
US 2021/0063646 A1    Mar. 4, 2021

Related U.S. Application Data

(60) Provisional application No. 62/561,123, filed on Sep. 20, 2017, provisional application No. 62/552,356, filed on Aug. 30, 2017.

(51) Int. Cl.
*G02B 6/293*    (2006.01)
*H01P 7/06*    (2006.01)
*H01P 11/00*    (2006.01)

(52) U.S. Cl.
CPC .............. *G02B 6/2934* (2013.01); *H01P 7/06* (2013.01); *H01P 11/008* (2013.01)

(58) Field of Classification Search
None
See application file for complete search history.

(56) References Cited

U.S. PATENT DOCUMENTS 7,054,009 B2    5/2006   Depue et al.
7,496,117 B2    2/2009   Tang et al.
(Continued)

FOREIGN PATENT DOCUMENTS

CN    110168444 A    8/2019
EP    3500892 A1    6/2019
(Continued)

OTHER PUBLICATIONS

Extended European Search Report for European Application No. 17869363.6 Search completed Feb. 28, 2020, dated Mar. 9, 2020, 09 Pgs.
(Continued)

*Primary Examiner* — Tina M Wong
(74) *Attorney, Agent, or Firm* — KPPB LLP

(57) ABSTRACT

Based on graphene heterostructure in chip-scale silicon nitride microresonators, optoelectronic control and modulation in frequency combs via group velocity dispersion modulation can be demonstrated. By tuning graphene Fermi level from 0.50 eV to 0.65 eV via electric-field gating, deterministic in-cavity group velocity dispersion control from anomalous (−62 fs²/mm) to normal (+9 fs²/mm) can be achieved with Q factor remaining high at $10^6$. Consequently, both the primary comb lines and the full comb spectra can be controllable dynamically with the on/off switching of the Cherenkov radiation, the tuning of the primary comb lines from 2.3 THz to 7.2 THz, and the comb span control from
(Continued)

zero comb lines to ~781 phase-locked comb lines, directly via the DC voltage.

20 Claims, 8 Drawing Sheets

(56) References Cited

U.S. PATENT DOCUMENTS

| | | | |
|---|---|---|---|
| 7,502,532 | B2 | 3/2009 | McCallion et al. |
| 7,684,664 | B2 | 3/2010 | Digonnet et al. |
| 7,965,914 | B2 | 6/2011 | Xu et al. |
| 9,537,571 | B2 | 1/2017 | Li et al. |
| 9,612,458 | B1* | 4/2017 | Lentine ............... G02F 1/025 |
| 9,880,446 | B2 | 1/2018 | Gottschall et al. |
| 9,905,999 | B2 | 2/2018 | Li et al. |
| 10,454,238 | B2 | 10/2019 | Fermann et al. |
| 11,063,402 | B2 | 7/2021 | Wong et al. |
| 2010/0317790 | A1* | 12/2010 | Jang .................... D01F 1/10 524/496 |
| 2011/0019957 | A1 | 1/2011 | Alameh |
| 2011/0255554 | A1 | 10/2011 | Delfyett |
| 2012/0039344 | A1 | 2/2012 | Kian et al. |
| 2013/0003766 | A1 | 1/2013 | Savchenkov et al. |
| 2014/0064734 | A1 | 3/2014 | Wtzens |
| 2014/0110572 | A1 | 4/2014 | Li et al. |
| 2015/0030040 | A1 | 1/2015 | Zhou et al. |
| 2015/0338202 | A1 | 11/2015 | Xiang et al. |
| 2016/0011489 | A1 | 1/2016 | Herr et al. |
| 2016/0139487 | A1* | 5/2016 | Popovic ............... G02F 1/025 385/2 |
| 2016/0147014 | A1 | 5/2016 | Ptasinski et al. |
| 2016/0161675 | A1* | 6/2016 | Englund ............ G02F 1/0118 250/206 |
| 2016/0327743 | A1 | 11/2016 | Kippenberg et al. |
| 2017/0329086 | A1 | 11/2017 | Latawiec et al. |
| 2018/0006424 | A1 | 1/2018 | Vahala et al. |
| 2018/0083599 | A1 | 3/2018 | Kippenberg et al. |
| 2018/0261288 | A1* | 9/2018 | Frumkin ............ G02B 6/12004 |
| 2019/0296512 | A1 | 9/2019 | Wong et al. |
| 2021/0063646 | A1* | 3/2021 | Yao ..................... G02F 1/353 |

FOREIGN PATENT DOCUMENTS

| | | |
|---|---|---|
| EP | 3532895 A1 | 9/2019 |
| EP | 3676646 A1 | 7/2020 |
| WO | 2018081824 A1 | 5/2018 |
| WO | 2018089075 A1 | 5/2018 |
| WO | 2019046645 A1 | 3/2019 |
| WO | 2019180655 A1 | 9/2019 |
| WO | 2020097241 A1 | 5/2020 |

OTHER PUBLICATIONS

International Preliminary Report on Patentability for International Application PCT/US2018/048954, Report issued Mar. 3, 2020, dated Mar. 12, 2020, 5 Pgs.
International Preliminary Report on Patentability for International Application PCT/US2017/047413, Report issued Feb. 19, 2019, dated Feb. 28, 2019, 5 Pgs.
International Preliminary Report on Patentability for International Application PCT/US2017/059390, Report issued Apr. 30, 2019, dated May 9, 2019, 6 Pgs.
International Search Report and Written Opinion for International Application No. PCT/US2019/060128, Search completed Jan. 13, 2020, dated Jan. 28, 2020, 10 Pgs.
International Search Report and Written Opinion for International Application No. PCT/US2017/047413, Search completed Apr. 11, 2018, dated Apr. 26, 2018, 10 Pgs.
International Search Report and Written Opinion for International Application No. PCT/US2017/059390, Search completed Jan. 26, 2018, dated Feb. 9, 2018, 12 Pgs.
International Search Report and Written Opinion for International Application No. PCT/US2018/048954, Search completed Oct. 28, 2018, dated Nov. 15, 2018, 11 Pgs.
Alnis et al., "Thermal-noise-limited crystalline whispering-gallery-mode resonator for laser stabilization", Physical Review A, vol. 84, No. 011804(R), 2011, pp. 011804-1-011804-4.
Aranson et al., "The World of the Complex Ginzburg-Landau Equation", Reviews of Modern Physics, Jan. 2002, vol. 74, pp. 99-143, doi: 10.1103/RevModPhys.74.99.
Bale et al., "Dissipative dispersion-managed solitons in modelocked lasers", Optics Letters, Nov. 1, 2009, vol. 34, No. 21, pp. 3286-3288, doi: 10.1364/OL.34.003286.
Bao et al., "Nonlinear conversion efficiency in Kerr frequency comb generation", Optics Letters, vol. 39, No. 21, 2014, pp. 6126-6129.
Bao et al., "Stretched cavity soliton in dispersion-managed Kerr resonators", Phys. Rev., Aug. 3, 2015, vol. A 92, pp. 023802-1-023802-7, DOI: 10.1103/PhysRevA.92.023802.
Birch et al., "An Updated Edlén Equation for the Refractive Index of Air", Metrologia, Jan. 1993, vol. 30, No. 3, pp. 155-162, DOI: 10.1088/0026-1394/30/3/004.
Bobroff, "Recent advances in displacement measuring interferometry", Meas. Sci. Technol., 1993, vol. 4, No. 9, pp. 907-926.
Bolotin et al., "Ultrahigh electron mobility in suspended graphene", Solid State Communications, 2008, vol. 146, Issues 9-10, pp. 351-355, available online Mar. 6, 2008, doi: 10.1016/j.ssc.2008.02.024.
Bonaccorso et al., "Graphene photonics and optoelectronics", Nature Photonics, Sep. 2010, vol. 4, pp. 611-622, published online Aug. 31, 2010, DOI:10.1038/nphoton.2010.186.
Boyd, "Nonlinear Optics", Academic Press, San Diego, CA, 2nd ed., 2003, pp. xv11, 578 p.
Brasch et al., "Photonic Chip Based Optical Frequency Comb Using Soliton Cherenkov Radiation", Science, Jan. 22, 2016, vol. 351, No. 6271, pp. 357-360, published online Dec. 31, 2015, doi: 10.1126/science.aad4811.
Brash et al., "Photonic chip-based optical frequency comb using soliton Cherenkov radiation", Science, Jan. 22, 2016, vol. 351, Issue 6271, pp. 357-360, DOI: 10.1126/science.aad4811.
Capmany et al., "Microwave photonics combines two worlds", Nature Photonics, Jun. 1, 2007, vol. 1, pp. 319-330.
Chakraborty et al., "Gain modulation by graphene plasmons in aperiodic lattice lasers", Science, Jan. 15, 2016, vol. 351, Issue 6270, pp. 246-248, doi: 10.1126/science.aad2930.
Chembo et al., "Modal expansion approach to optical-frequency-comb generation with monolithic whispering-gallery-mode resonators", Physics Review A, 2010, vol. A 82, pp. 0338011-03380118.
Chong et al., "All-normal-dispersion femtosecond fiber laser with pulse energy above 20 nJ", Optics Letters, Aug. 15, 2007, vol. 32, No. 16, pp. 2408-2410, doi: 10.1364/OL.32.002408.
Ciddor et al., "Refractive index of air: new equations for the visible and near infrared", Applied Optics, Mar. 20, 1996, vol. ;35, No. 9, pp. 1566-1573 doi: 10.1364/AO.35.001566.
Cingoz et al., "Direct frequency comb spectroscopy in the extreme ultraviolet", Nature, Feb. 1, 2012, vol. 482, pp. 68-71.
Coddington et al., "Coherent Multiheterodyne Spectroscopy Using Stabilized Optical Frequency Combs", Physical Review Letters, Jan. 11, 2008, vol. 100, No. 1, pp. 013902-1-013902.
Coddington et al., "Rapid and precise absolute distance measurements at long range", Nature Photonics, Jun. 2009, vol. 3, pp. 351-356, published online May 24, 2009, DOI: 10.1038/nphoton.2009.94.
Coen et al., "Modeling of octave-spanning Kerr frequency combs using a generalized mean-field Lugiato-Lefever model", Optics Letters, Jan. 2013, vol. 38, pp. 1-4, arXiv:1211.1697.
Coen et al., "Modulational Instability Induced by Cavity Boundary Conditions in a Normally Dispersive Optical Fiber", Physical Review Letters, vol. 79, No. 21, Nov. 24, 1997, pp. 4139-4142.
Coillet et al., "Azimuthal Turing Patterns, Bright and Dark Cavity Solitons in Kerr Combs Generated with Whispering-Gallery-Mode Resonators", IEEE Photonics Journal, Aug. 2013, vol. 5, No. 4, pp. 6100409-1-6100409-10, DOI: 10.1109JPHOT.2013.2277882.

(56) References Cited

OTHER PUBLICATIONS

Cole et al., "Soliton crystals in Kerr resonators", Nature Photonics, Sep. 25, 2017, vol. 11, pp. 671-676, DOI:10.1038/s41566-017-0009-z.

Conforti et al., "Modulational instability in dispersion oscillating fiber ring cavities", Optical Letters, May 2014, vol. 39, pp. 4200-4203.

Cundiff et al., "Experimental evidence for soliton explosions", Physical Review Letters, Feb. 18, 2002, vol. 88, No. 7, pp. 073903-1-073903-4, doi: 10.1103/PhysRevLett.88.073903.

Cundiff et al., "Optical arbitrary waveform generation", Nature Photonics, vol. 4, Nov. 2010, Published Online: Oct. 29, 2010, pp. 760-765.

Jones et al., "Carrier-Envelope Phase Control of Femtosecond Mode-Locked Lasers and Direct Optical Frequency Synthesis", Science, vol. 288, Apr. 28, 2000, pp. 635-639.

Joo et al., "Absolute distance measurement by dispersive interferometry using a femtosecond pulse laser", Optics Express, Jun. 26, 2006, vol. 14, No. 13, pp. 5954-5960.

Joo et al., "Distance measurements by combined method based on a femtosecond pulse laser", Optics Express, Nov. 24, 2008, vol. 16, No. 24, pp. 19799-19806, first published Nov. 14, 2008.

Joshi et al., "Thermally controlled comb generation and soliton modelocking in microresonators", Optics Letters, Jun. 1, 2016, vol. 41, No. 11, pp. 2565-2568.

Kang etal, "Real-time compensation of the refractive index of air in distance measurement", Optics Express, Oct. 2015, vol. 23, No. 20, pp. 26377-26385, DOI: 10.1364/OE.23.026377.

Karpov et al., "Universal dynamics and deterministic switching of dissipative Kerr solitons in optical microresonators", Nature Physics, Sep. 2016, pp. 1-6, doi 10.1038/nphyS3893.

Kim, "Metrology: combs rule", Nat. Photon, 2009, vol. 3, No. 6, pp. 313-314.

Kim et al., "High-Performance Flexible Graphene Field Effect Transistors with ion Gel Gate Dielectrics", Nano Lett. 2010, 10, 3464-3466. Abstract, p. 3464 col. 2, p. 3465 col. 2, p. 3466 col. 1.

Kim et al., "Large-scale pattern growth of graphene films for stretchable transparent electrodes", Nature, Jan. 14, 2009, vol. 457, pp. 706-710, https://doi.org/10.1038/nature07719.

Kippenberg et al., "Dissipative Kerr solitons in optical microresonators", Science, Aug. 10, 2018, vol. 361, 567, 13 pgs.

Kippenberg et al., "Microresonator-Based Optical Frequency Combs", Science, Apr. 29, 2011, vol. 332, pp. 555-559.

Koppens et al., "Photodetectors based on graphene, other two-dimensional materials and hybrid systems", Nature Nanotechnology, Oct. 2014, vol. 9, No. 10, pp. 780-793, doi:10.1038/nnano.2014.215.

Kordts et al., "Higher order mode suppression in high-Q anomalous dispersion SiN microresonators for temporal dissipative Kerr soliton formation.", Nov. 17, 2015, pp. 1-5, arXiv:1511.05381.

Krausz et al., "Attosecond metrology: from electron capture to future signal processing", Nature Photonics, vol. 8, Mar. 2014, Published Online: Feb. 28, 2014, pp. 205-213.

Lamont et al., "Route to stabilized ultrabroadband microresonator-based frequency combs", Optics Letters, 2013, vol. 38, Issue 18, pp. 3478-34811.

Larkin et al., "Efficient nonlinear algorithm for envelope detection in white light interferometry", Journal Opt. Soc. Am. A. Apr. 1996, vol. 13, No. 4, pp. 832-843.

Lee, "Colloidal superlattices for unnaturally high-index metamaterials at broadband optical frequencies", Optics Express, Nov. 2, 2015, vol. 23, No. 22, pp. 28170-28181, first published Oct. 19, 2015, doi:10.1364/OE.23.028170.

Lee et al., "Time-of-flight measurement with femtosecond light pulses", Nature Photonics, Oct. 2010, vol. 4, pp. 716-720, first published Aug. 8, 2010, DOI: 10.1038/nphoton.2010.175.

Lepetit et al., "Linear techniques of phase-measurement by femtosecond spectral interferometry for applications in spectroscopy", J. Opt. Soc. Am. B, Dec. 1995, vol. 12, No. 12, pp. 2467-2474.

Li et al, "Compact and stable temporally magnified tomography using phase-locked broadband source", Opt. Let, 2016, vol. 41, Issue 7, pp. 1562-1565.

Li et al., "A laser frequency comb that enables radial velocity measurements with a precision of 1 cm s-1", Nature, vol. 452, Apr. 3, 2008, pp. 610-612.

Li et al., "Dirac charge dynamics in graphene by infrared spectroscopy", Nature Physics, Jul. 2008, vol. 4, pp. 532-535, published online Jun. 8, 2008, doi:10.1038/nphys989.

Liang et al., "High spectral purity Kerr frequency comb radio frequency photonic oscillator", Nature Communications, Aug. 11, 2015, vol. 6, No. 7957, pp. 1-8.

Liu et al., "A graphene-based broadband optical modulator", Nature, May 11, 2011, vol. 474, pp. 64-67, doi:10.1038/nature10067.

Liu et al., "Investigation of mode coupling in normal-dispersion silicon nitride microresonators for Kerr frequency comb generation", Optica, vol. 1, No. 3, Sep. 2014, pp. 137-144.

Liu et al., "Plasmon resonance enhanced multicolour photodetection by graphene", Nature Communications, Dec. 6, 2011, vol. 2, No. 579, pp. 1-7, doi:10.1038/ncomms1589.

Liu et al., "Sub-micron absolute distance measurements in sub-millisecond times with dual free-running femtosecond Er fiber-lasers", Optics Express, Sep. 12, 2011, vol. 19, No. 19, pp. 18501-18509, first published Sep. 7, 2011.

Manzoni et al., "Coherent pulse synthesis: towards sub-cycle optical waveforms", Laser & Photonics Reviews, 2015, vol. 9, No. 2, pp. 129-171.

Marin-Palomo et al., "Microresonator-based solitons for massively parallel coherent optical communications", Nature Jun. 8, 2017, vol. 546, pp. 274-279, DOI: 10.1038/nature22387.

Matsko et al., "On timing jitter of mode locked Kerr frequency combs", Optics Express, Nov. 18, 2013, vol. 21, No. 23, pp. 28862-28876.

Mikhailov et al., "A new electromagnetic mode in graphene", Phys. Rev. Lett., 2007, arXiv:cond/0703406, Mar. 15, 2007, 5 pgs.

Mikhailov et al., "New Electromagnetic Mode in Graphene", Physical Review Letters, Jul. 6, 2007, vol. 99, 016803, pp. 016803-1-016803-4, doi: 10.1103/PhysRevLett.99.016803.

Minoshima et al., "High-accuracy measurement of 240-m distance in an optical tunnel by use of a compact femtosecond laser", Applied Optics, Oct. 20, 2000, vol. 39, No. 30, pp. 5512-5517.

Moss et al., "New CMOS-compatible platforms based on silicon nitride and Hydex for nonlinear optics", Nature Photonics, Aug. 2013, vol. 7, pp. 597-607, published online Jul. 30, 2013, DOI:101038/nphoton2013/183.

Ooi et a., "Waveguide engineering of graphene's nonlinearity", Applied Physics Letters, Sep. 18, 2014, vol. 105, pp. 111110-1-111110-4, http://dx.doi.org/10.1063/1.4895934.

Papp et al., "Microresonator frequency comb optical clock", Optica, vol. 1, Jul. 22, 2014, pp. 10-14.

Papp et al., "Parametric seeding of a microresonator optical frequency comb", Optics Express, vol. 21, No. 15, Jul. 29, 2013, pp. 17615-17624.

Parra-Rivas et al., "Dynamics of localized and patterned structures in the Lugiato-Lefever equation determine the stability and shape of optical frequency combs", Physical Review A, Jan. 2014, vol. 89, pp. 043813-1-043813-12, doi: 10.11038PhysRevA.89.043813.

Parra-Rivas et al., "Third-order chromatic dispersion stabilizes Kerr frequency combs", Optics Letters, 2014, vol. 39, Issue 10, pp. 2971-2975, arXiv:1403.0903.

Pfeifle et al., "Coherent terabit communications with microresonator Kerr frequency combs", Europe PMC Funders Group, Author Manuscript, published in final edited for as: National Photonics, May 1, 2014, vol. 8, No. 5, pp. 375-380, doi:10.1038/nphoton.2014.57.

Phare et al., "Graphene electro-optic modulator with 30 GHz bandwidth", Nature Photonics, Aug. 2015, vol. 9, pp. 511-514, published online Jul. 13, 2015, doi: 10.1038/nphoton.2015.122.

Piglosiewics et al., "Carrier-envelope phase effects on the strong-field photoemission of electrons from metallic nanostructures", Nature Photonics, vol. 8, Jan. 2014, Published Online: Nov. 10, 2013, pp. 37-42.

(56) References Cited

OTHER PUBLICATIONS

Roy et al., "Dynamics of periodic pulse collisions in a strongly dissipative-dispersive system", Physical Review Letters, May 27, 2005, vol. 94, No. 20, pp. 203903-1-203903-4, doi: 10.1103/PhysRevLett.94.203903.
Das et al., "Monitoring dopants by Raman scattering in an electrochemically top-gated graphene transistor", Nature Nanotechnology, Apr. 2008, vol. 3, pp. 210-215, published online Mar. 30, 2008, doi: 10.1038/nnano.2008.67.
Del'Haye et al., "Full Stabilization of a Microresonator-Based Optical Frequency Comb", Physical Review Letters, Aug. 1, 2008 pp. 053903-1-053903-4.
Del'Haye et al., "Optical frequency comb generation from a monolithic microresonator", Nature, vol. 450, Dec. 20, 2007, pp. 1214-1217.
Del'Haye et al., "Phase Coherent Link of an Atomic Clock to a Self-Referenced Microresonator Frequency Comb", Nature, vol. 450, Dec. 20, 2007, 12 pgs.
Del'Haye et al., "Phase-coherent microwave-to-optical link with a self-referenced microcomb", Nature Photonics, Aug. 2016, vol. 10, pp. 516-520, published online Jun. 6, 2016, doi: 10.1038/nphoton.2016.105.
Diddams et al., "An Optical Clock Based on a Single Trapped $^{199}$Hg$^+$ Ion", Science, Aug. 3, 2001, vol. 203, pp. 825-828.
Diddams et al., "Direct Link between Microwave and Optical Frequencies with a 300 THz Femtosecond Laser Comb", Physical Review Letters, May 29, 2000, vol. 84, No. 22, pp. 5102-5105.
Diddams et al., "Standards of Time and Frequency at the Outset of the 21st Century", Science, vol. 306, Nov. 19, 2004, pp. 1318-1324.
Doloca et al., "Absolute distance measurement system using a femtosecond laser as a modulator", Measurement Science and Technology, Sep. 24, 2010, vol. 21, No. 11, 115302.
Du et al., "Tunability Analysis of a Graphene-Embedded Ring Modulator", IEEE Photonics Technology Letters, Oct. 15, 2014, vol. 26, No. 20, pp. 2008-2011.
Dudley et al., "Instabilities, breathers and rogue waves in optics", Nature Photonics, Sep. 28, 2014, vol. 8, pp. 755-764, doi: 10.1038/nphoton.2014.220.
Erkinatalo et al., "Cascaded Phase Matching and Nonlinear Symmetry Breaking in Fiber Frequency Combs", Physical Review Letters, Nov. 30, 2012, vol. 109, No. 2, first published Nov. 27, 2012, doi: 10.1103/PhysRevLett.109.223904.
Ferdous et al., "Spectral line-by-line pulse shaping of on-chip microresonator frequency combs", Nature Photonics, vol. 5, Dec. 2011, Published Online: Oct. 9, 2011, pp. 770-776.
Fescenko et al., "Dual-mode temperature compensation technique for laser stabilization to a crystalline whispering gallery mode resonator", Optics Express, vol. 20, No. 17, Aug. 13, 2012, pp. 19185-19193.
Gao et al., "Measurement technologies for precision positioning", CIRP Annals—Manufacturing Technology, 2015, vol. 64, Issue 2, pp. 773-796, available online Jun. 15, 2015, https://doi.org/10.1016/j.cirp.2015.05.009.
Giacomo, "News from the BIPM", Metrologia, 1984, vol. 20, No. 1, pp. 25-30.
Gilbert et al., "Hydrogen Cyanide H131C14N Absorption Reference for 1530 nm to 1565 nm Wavelength Calibration—SRM 2519a", NIST Special Publication 260-137, Aug. 2005, 29 pgs.
Godey et al., "Stability analysis of the spatiotemporal Lugiato-Lefever model for Kerr optical frequency combs in the anomalous and normal dispersion regimes", Physical Review, 2014, vol. A 89, pp. 063814-1-063814-21.
Gohle et al., "A frequency comb in the extreme ultraviolet", Nature, Jul. 14, 2005, vol. 436, pp. 234-237, doi:10.1038/nature03851.
Grelu et al., "Dissipative solitons for mode-locked lasers", Nature Photonics, Feb. 1, 2012, vol. 6, pp. 84-92, doi: 10.1038/nphoton.2011.345.
Grigorenko et al., "Graphene plasmonics", Nature Photonics, Nov. 5, 2012, vol. 6, pp. 749-758, published online Oct. 31, 2012, doi: 10.1038/nphoton.2012.262.
Gu et al., "Regenerative oscillation and four-wave mixing in graphene optoelectronics", Nature Photonics, Aug. 2012, vol. 6, pp. 554-559, first published Jul. 15, 2012, doi: 10.1038/nphoton.2012.147.
Han et al., "Parallel determination of absolute distances to multiple targets by time-of-flight measurement using femtosecond light pulses", Optics Express, Oct. 5, 2015, vol. 23, No. 20, pp. 25874-25882, published Apr. 23, 2015, doi: 10.1364/OE.23.025874.
Hanson, "Dyadic Green's Functions and Guided Surface Waves for a Surface Conductivity Model of Graphene", Journal of Applied Physics, 2008, vol. 103, pp. 064302-1-064302-8, doi: 10.1063/1.2891452.
Haus et al., "Stretched-Pulse Additive Pulse Mode-Locking in Fiber Ring Lasers: Theory and Experiment", IEEE Journal of Quantum Electronics, Mar. 1995, vol. 31, No. 3, pp. 591-598, doi: 10.1109/3.364417.
Haus et al., "Structures for additive pulse mode locking", Journal of the Optical Society of America, Oct. 1991, vol. 8, No. 10, pp. 2068-2076, doi: 10.1364/JOSAB.8.002068.
Hendry et al., "Coherent Nonlinear Optical Response of Graphene", Physical Review Letters, Aug. 27, 2010, vol. 105, pp. 097401-1-09740-4, DOI: 10.1103/PhysRevLett.105.097401.
Herr et al., "Temporal solitons in optical microresonators", Nature Photonics, vol. 8, Feb. 2014, Published Online: Dec. 22, 2013, pp. 145-152, doi: 10.1038/nphoton.2013.343.
Herr et al., "Universal formation dynamics and noise of Kerr-frequency combs in microresonators", Nature Photonics, Jul. 2012, vol. 6, pp. 480-487, published online Jun. 24, 2012, doi:10.1038/mphoton.2012.127.
Holzwarth et al., "Optical Frequency Synthesizer for Precision Spectroscopy", Physical review Letters, vol. 85, No. 11, Sep. 11, 2000, pp. 2264-2267.
Huang et al., "A broadband chip-scale optical frequency synthesizer at 2.7 × 10-16 relative uncertainty", Sciences Advances, Apr. 22, 2016, vol. 2, e1501489, pp. 1-7.
Huang et al., "A low-phase-noise 18 GHz Kerr frequency microcomb phase-locked over 65 THz", Scientific Reports, Aug. 27, 2015, vol. 5, Issue 13355, pp. 1-7.
Huang et al., "Globally Stable Microresonator Turing Pattern Formation of Coherent High-Power THz Radiation On-Chip", Physical Review x, vol. 7, 2017, pp. 041002-1-041002-25.
Huang et al., "High-energy pulse synthesis with sub-cycle waveform control for strong-field physics", Nature Photonics, vol. 5, Aug. 2011, Published Online: Jul. 24, 2011, pp. 475-479.
Huang et al., "Mode-Locked Ultrashort Pulse Generation from On-Chip Normal Dispersion Microresonators", Physical Review Letters, Feb. 4, 2015, vol. 114, pp. 053901-1-053901-5, doi: 10.1103/PhysRevLett.114.053901.
Huang et al., "Phase stabilization of Kerr frequency comb internally without nonlinear optical interferometry", arXiv, Nov. 9, 2016, pp. 1-6, 9, 15-17.
Huang et al., "Smooth and flat phase-locked Kerr frequency comb generation by higher order mode suppression", Scientific Reports, May 16, 2016, vol. 6, pp. 1-7, doi:10.1038/srep26255.
Huang et al., "Universally stable microresonator Turing patters formation for coherent high-powr THz radiation on-chip", 2016, arXiv:1603.00948, retrieved from https://www.semanticscholar.org/paper/Universally-stable-microresonator-Turing-pattern-Huang-Yang/da819648ba9b5225970c9d3cfd47fa716caf7a71, 26 pgs.
Ideguchi et al., "Coherent Raman spectro-imaging with laser frequency combs", Nature, Oct. 15, 2013, vol. 502, pp. 355-358.
Ilday et al., "Self-Similar Evolution of Parabolic Pulses in a Laser", Physical Review Letters, May 27, 2004, vol. 92, No. 21, pp. 213902-1-2139024, doi: 10.1103/PhysRevLett.92.213902.
Jang et al., "Absolute Distance Meter Operating on a Free-Running Mode-Locked Laser for Space Mission", International Journal of Precise Engineering and Manufacturing, 2018, vol. 19, No. 7, pp. 975-981.
Jang et al., "Comb-referenced laser distance interferometer for industrial nanotechnology", Comb-referenced laser distance interferometer for industrial nanotechnology, Scientific Reports, Aug. 25, 2016, vol. 6, No. 31770, pp. 1-10, DOI:10.1038/srep31770.
Jang et al., "Compensation of the refractive index of air in laser interferometer for distance measurement: A review", International

(56) References Cited

OTHER PUBLICATIONS

Journal of Precision Engineering and Manufacturing, Dec. 2017, vol. 18, No. 12, pp. 1881-1890, DOI: 10.1007/s12541-017-0217-y.
Jin et al., "Absolute length calibration of gauge blocks using optical comb of a femtosecond pulse laser", Optics Express, Jun. 26, 2006, vol. 14, Issue 13, pp. 5968-5974, https://doi.org/10.1364/OE.14.005968.
Saglamyurek et al., "Broadband waveguide quantum memory for entangled photons", Nature, Jan. 12, 2011, vol. 469, pp. 512-515, DOI:10.1038/nature09719.
Saha et al., "Modelocking and femtosecond pulse generation in chip-based frequency combs", Optics Express, vol. 21, No. 1, Jan. 14, 2013, pp. 1335-1343.
Salem et al., "Application of space-time duality to ultrahigh-speed optical signal processing", Adv. Opt. Photon, 2013, vol. 5, Issue 3, pp. 274-317.
Schuhler et al., "Frequency-comb-referenced two-wavelength source for absolute distance measurement", Optics Letters, 2006, vol. 31, Issue 21, pp. 3101-3103, https://doi.org/10.1364/OL.31.003101.
Skryabin et al., "Looking at a soliton through the prisms of optical supercontinuum", Review of Modern Physics, vol. 82, Apr. 2010, pp. 1287-1299, arXiv:1005.2777 [physics.optics] May 16, 2010.
Solli et al., "Optical rogue waves", Nature, Dec. 13, 2007, vol. 450, pp. 1054-1057, doi: 10.1038/nature06402.
Song et al., "Impact of pulse dynamics on timing jitter in mode-locked fiber lasers", Optics Letters, May 2011, vol. 36, No. 10, 5 pgs.
Spencer et al., "An optical-frequency synthesizer using integrated photonics", Nature, 2018, vol. 557, pp. 81-85.
Steinmetz et al., "Laser Frequency Combs for Astronomical Observations", Science, 2008, vol. 321, pp. 1335-1337.
Stern et al., "Battery-operated integrated frequency comb generator", Nature, Oct. 2018, vol. 562, No. 7727, pp. 401-405, Epub Oct. 8, 2018, doi: 10.1038/s41586-018-0598-9.
Suh et al., "Microresonator soliton dual-comb spectroscopy", Science, Nov. 4, 2016, vol. 354, Issue 6312, pp. 600-603, DOI: 10.1126/science.aah6516, arXiv:1607.08222, Jul. 27, 2016.
Suh et al., "Soliton Microcomb Range Measurement", Science, Jun. 28, 2017, vol. 359, pp. 884-887, arXiv:1705.06697.
Tamura et al., "77-fs pulse generation from a stretched-pulse mode-locked all-fiber ring laser", Optics Letters, 1993, vol. 18, No. 13, pp. 1080-1082, doi: 10.1364/OL.18.001080.
Trocha et al., "Ultrafast Optical Ranging Using Microresonator Soliton Frequency Combs", Science, Feb. 23, 2018, vol. 359, pp. 887-891.
Udem et al., "Optical frequency metrology", Nature, Mar. 14, 2002, vol. 416, pp. 233-237.
Vakil et al., "Transformation optics using graphene", Science, Jun. 10, 2011, vol. 332, Issue 6035, pp. 1291-1294.
Van Den Berg et al., "Many-wavelength interferometry with thousands of lasers for absolute distance measurement", Physical Review Letters, May 4, 2012, vol. 108, No. 18, pp. 183901.
Wabnitz, "Suppression of interactions in a phase-locked soliton optical memory", Optics Letters, Apr. 15, 1993, vol. 18, No. 8, pp. 601-603.
Wang et al., "Absolute positioning by multi-wavelength interferometry referenced to the frequency comb of a femtosecond laser", Optics Express, Apr. 6, 2015, vol. 23, No. 7, pp. 9121-9129, first published Apr. 1, 2015, doi: 10.1364/OE.23.009121.
Wang et al., "Gate-Variable Optical Transitions in Graphene", Science, Apr. 11, 2008, vol. 320, pp. 206-209.
Wei et al., "Precision and broadband frequency swept laser source based on high-order modulation-sideband injection-locking", Optics Express, vol. 23, No. 4, Feb. 17, 2015, pp. 4970-4980, see pp. 4970-4973.
Wirth et al., "Synthesized Light Transients", Science, vol. 334, Oct. 14, 2011, pp. 195-200.
Wu et al., "Dissipative soliton resonance in an all-normal-dispersion erbium-doped fiber laser", Optics Express, Mar. 24, 2009, vol. 17, No. 7, pp. 5580-5584, doi: 10.1364/OE.17.005580.
Wu et al., "Extremely high-accuracy correction of air refractive index using two-colour optical frequency combs", Scientific Reports, May 30, 2013, vol. 3, No. 1894, DOI: 10.1038/srep01894.
Wu et al., "Generation of cascaded four-wave-mixing with graphene-coated microfiber", Photon. Res., Apr. 2015, vol. 3, No. 2, pp. A64-A68, https://dx.doi.org/10.1364/PRJ.3.000A64.
Xu et al., "Holey graphene frameworks for highly efficient capacitive energy storage", Nature Communications, Aug. 8, 2014, vol. 5, Article No. 4554, pp. 1-8, doi: 10.1038/ncomms5554.
Xuan et al., "High-Q silicon nitride microresonators exhibiting low-power frequency comb initiation", Optica 2016, 3, pp. 1171-1180, http://dx.doi/org/10.1364/OPTICA.3.001171.
Xue et al., "Mode-locked dark pulse Kerr combs in normal-dispersion microresonators", Nature Photonics, Aug. 10, 2015, vol. 9, pp. 594-600, doi: 10.1038/nphoton.2015.137.
Yang et al., "Counter-propagating solitons in microresonators", Nature Photonics, 2017, vol. 11, pp. 560-564, arX14:1704.08409, May 2, 2017.
Yang et al., "An all-optical modulation method in sub-micron scale", Scientific Reports, Mar. 17, 2015, vol. 5, No. 9206, pp. 1-5, doi: 10.1038/srep09206.
Yang et al., "Stokes solitons in optical microcavities", Nature Physics, Jan. 2017, vol. 13, pp. 53-58, published Sep. 5, 2016, DOI: 10.1038/NPHYS3875.
Yao et al., "Gate-tunable frequency combs in graphene-nitride microresonators", Nature, Jun. 21, 2018, vol. 558, pp. 410-414, https://doi.org/10.1038/s41586-018-0216-x.
Yao et al., "Graphene based widely-tunable and singly-polarized pulse generation with random fiber lasers", Scientific Reports, Dec. 21, 2015, vol. 5, No. 18526, pp. 1-8, doi:10.1038/srep18526.
Yao et al., "Graphene Bragg gratings on microfiber", Optics Express, Oct. 6, 2014, vol. 22, No. 20, pp. 23829-23835, published Sep. 22, 2014, doi:10.1364/OE.22.023829.
Yariv et al., "Critical Coupling and Its Control in Optical Waveguide-Ring Resonator Systems", IEEE Photonics Technology Letters, Apr. 2002, vol. 14, No. 4, pp. 483-485.
Ye et al., "Femtosecond Optical Frequency Comb Technology", Springer, New York, NY, 2005, 370 pgs., (presented in two parts).
Yi et al., "Soliton frequency comb at microwave rates in a high-Q silica microresonator", Optica, Dec. 17, 2015, vol. 2, No. 12, pp. 1078-1085, doi: 10.1364/OPTICA.2.001078.
Yu et al., "Dispersion-managed soliton interactions in optical fibers", Optics Letters, 1997, vol. 22, No. 11, pp. 793-795, doi: 10.1364/OL.22.000793.
Zhang et al., "Generation of two-cycle pulses and octave spanning frequency combs in a dispersion-flattened micro-resonator", Optics Letters, Dec. 1, 2013, vol. 38, No. 23, pp. 5122-5125.
Zhou et al., "Stability and intrinsic fulctuations of dissipative cavity solitons in Kerr frequency micocombs", IEEE Photonics Journal, Jun. 2015, vol. 7, No. 3, 13 pgs.
"Extended Search Report for European Application No. 18851696.7", Search completed Mar. 31, 2021, dated Apr. 19, 2021, 5 pgs.
International Preliminary Report on Patentability for International Application PCT/US2019/060128, Report issued May 11, 2021, dated May 20, 2021, 6 Pgs.

* cited by examiner

GRAPHENE MICROCAVITY FREQUENCY COMBS AND RELATED METHODS OF MANUFACTURING

CROSS-REFERENCE TO RELATED APPLICATIONS

The current application is a national stage of PCT Patent Application No. PCT/US2018/048954, entitled "Graphene Microcavity Frequency Combs and Related Methods of Manufacturing" to Baicheng Yao et al., filed Aug. 30, 2018, which claims the benefit of and priority under 35 U.S.C. § 119(e) to U.S. Provisional Patent Application No. 62/552,356 entitled "Graphene Microcavity Frequency Combs and Related Methods of Manufacturing," filed Aug. 30, 2017 and U.S. Provisional Patent Application No. 62/561,123 entitled "Graphene Microcavity Frequency Combs and Related Methods of Manufacturing," filed Sep. 20, 2017. The disclosures of PCT Patent Application No. PCT/US2018/048954 and U.S. Provisional Patent Application Nos. 62/552,356 and 62/561,123 are hereby incorporated by reference in their entireties for all purposes.

STATEMENT REGARDING FEDERALLY SPONSORED RESEARCH

This invention was made with Government support under 1611598 and 1520949, awarded by the National Science Foundation. The Government has certain rights in the invention.

FIELD OF THE INVENTION

The present invention generally relates to frequency combs and, more specifically, graphene microcavity frequency combs.

BACKGROUND

An optical frequency comb can be referred to as an optical spectrum that is made up of a series of discrete, equally spaced frequency lines. The frequency comb may have equidistant optical frequency components, while the intensity of the comb lines can vary substantially. The frequencies of these lines can be known to a high degree of accuracy, which allows the frequency comb to be used as an optical ruler. Optical frequency combs can provide equidistant frequency markers in various bands, allowing for substantial breakthroughs across a variety of different domains, such as but not limited to precision metrology and spectroscopy, astronomical observations, ultrafast optics, and quantum information. For example, if the comb frequencies are known, the frequency comb can be used to measure unknown frequencies by measuring beat notes, which reveal the difference in frequency between the unknown frequency and the comb frequencies.

Early attempts to produce broadband frequency combs were based on strongly driven electro-optic modulators, which can impose dozens of sidebands on a single-frequency input beam from a single-frequency continuous-wave laser. It was then found that this process could be made more efficient (for obtaining more comb lines) by placing the modulator in a resonant cavity, particularly when the intracavity dispersion was minimized. Further improvements were based on parametric amplification.

SUMMARY OF THE INVENTION

One embodiment includes a microresonator including a silicon nitride ring cladded with silicon dioxide, wherein the silicon oxide defines a window above a region of the silicon nitride ring, a bus waveguide coupled to the silicon nitride ring, a graphene ion-gel heterostructure disposed within the window above the region of the silicon nitride ring, wherein the graphene/ion-gel heterostructure includes a graphene monolayer, source-drain electrodes integrated on the graphene monolayer, and a layer of ionic liquid used as a gate dielectric, wherein the microresonator is configured to form a frequency comb tunable through the modulation of the dispersion of the microresonator.

In another embodiment, the modulation of the intracavity dispersion is achieved through the tuning of the Fermi level of the graphene monolayer using an applied gate voltage.

In a further embodiment, the Fermi level of the graphene monolayer can be tuned from about 0.45 eV to about 0.65 eV.

In still another embodiment, the dispersion of the microresonator can be tuned from about −62 $fs^2$/mm anomalous dispersion to about +9 $fs^2$/mm normal dispersion through tuning the gate voltage from about −2 V to about 0 V.

In a still further embodiment, the microresonator is configured to form a frequency comb having a relative spectral location that is tunable from about 2.3 THz to about 7.2 THz.

In yet another embodiment, the microresonator is configured to form a frequency comb having a relative spectral location that is tunable from about 2.3 THz to about 7.2 THz by tuning the applied gate voltage from about −1 V to about −1.5 V.

In a yet further embodiment, a fixed source-drain voltage of 10 mV is applied to the graphene ion-gel heterostructure.

In another additional embodiment, the microresonator is capable of achieving multi-soliton states.

In a further additional embodiment, the microresonator is capable of achieving soliton states with soliton numbers of 12, 11, 9, 8, 6, 5, and 4.

In another embodiment again, the microresonator has a loaded quality factor of about $1.6 \times 10^6$.

In a further embodiment again, the source-drain electrodes comprise Ti/Au.

In still yet another embodiment, the ionic liquid comprises diethylmethyl(2-methoxyethyl)ammonium bis(trifluoromethylsulfonyl)imide.

In a still yet further embodiment, the layer of ionic liquid provides a capacitance of about 7.2 $\mu F/cm^2$.

In still another additional embodiment, the graphene monolayer is disposed about 100 nm away from the silicon nitride ring.

In a still further additional embodiment, the graphene monolayer is disposed about 300 nm away from the silicon nitride ring.

In still another embodiment again, the graphene monolayer and the silicon nitride ring have a planar interaction arc length of about 80 μm.

In a still further embodiment again, the silicon nitride ring has a cross section of about 1200 nm×800 nm.

In yet another additional embodiment, the silicon nitride ring has a diameter of about 350 μm.

In a yet further additional embodiment, the bus waveguide has a cross section of about 1000 nm×800 nm.

In yet another embodiment again, the bus waveguide is disposed about 600 nm away from the silicon nitride ring.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as exemplary embodiments of the invention and should not be construed as a complete recitation of the scope of the invention.

DETAILED DESCRIPTION

Figure 1A:
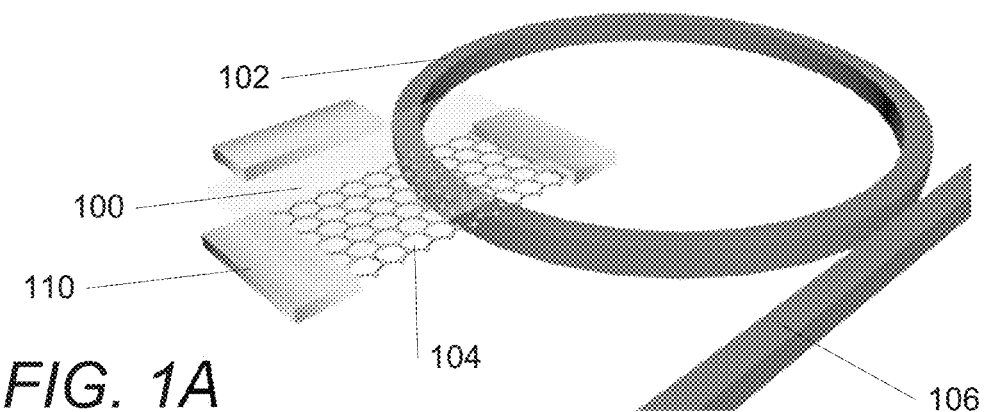
FIG. 1A conceptually illustrates a schematic architecture of a graphene microring resonator in accordance with an embodiment of the invention.

Turning now to the drawings, gate-tunable frequency combs and related methods of manufacturing in accordance with embodiments of the invention are illustrated. Optical frequency combs are cornerstones in frequency metrology, precision spectroscopy, astronomical observations, ultrafast optics, and quantum information. Based on the Kerr and Raman nonlinearities in monolithic ultrahigh-Q microresonators, chip-scale frequency combs have recently been examined, advancing studies in optical clockwork and observations of temporal cavity solitons. However, the intracavity dispersion, which can determine the comb formation, is hardly amenable to electric-field tenability-whether in microcavities or fiber cavities. Arising from its exceptional Fermi-Dirac tunability and ultrafast carrier mobility, graphene has a complex dispersion ($n_g = n_{g,r} + i n_{g,i}$), which can be determined by its gate-tunable optical conductivity. This characteristic has brought about a variety of optoelectronic advances, ranging from modulators, photodetectors to controllable plasmonics. Many embodiments of the invention are directed at combining the cross-disciplinary field of Dirac fermions in two-dimensional graphene to show the gated intracavity-tunability of graphene based optical frequency combs. The 2D surface material is also logically extensible to other 2D materials other than graphene, such as but not limited to other thin-film semiconductors, semimetals, transition metal dichalcogenides. With the unique linear and massless band structure of graphene, the gate-tunable optical conductivity can be coupled onto a photonic microresonator, modulating its second- and higher-order dispersions through the Fermi level. In many embodiments, a dual-layer ion-gel-gated transistor can be implemented to tune the electron-hole carrier population for the dynamical and reversible frequency comb control while also preserving cavity quality factors up to $10^6$ in the graphene-based comb. The Fermi level of the graphene can be tuned up to 0.65 eV under single-volt-level control. The formation of charge-tunable primary comb lines, coherent Kerr frequency combs, controllable Cherenkov radiation, and controllable multi-soliton states can all be achieved in a single microcavity. The voltage-tunable transitions from periodic soliton crystals to crystals with defects can also be demonstrated, mapped by an ultrafast second harmonic optical autocorrelation. This heterogeneous graphene-microcavity can provide a new fundamental platform for the understanding of dynamical frequency combs and ultrafast optics at the interface of single atomic layer nanoscience and ultrafast optoelectronics.

Temporal cavity solitons in active nonlinear microresonators have recently been observed. These femtosecond soliton pulses can span an octave using well-established nonlinear spectral broadening techniques, providing a concrete path towards self-referenced optical frequency microcombs. Different from the canonical soliton in a conservative system, these temporal cavity solitons can be formed in dissipative nonlinear resonators, and their existence can rely on the composite balance between parametric gain and cavity loss as well as between Kerr nonlinearity and cavity dispersion. Dispersion, which determines the temporal redistribution of pulse energy, can be important in defining the pulse shape, stability zone and the excitation pathway of the temporal cavity solitons. Nevertheless, while the parametric gain (via Kerr nonlinearity) can be controlled with the change of pump power, the cavity dispersion is generally predefined only by the waveguide design in the current state of the art. Furthermore, since light is tightly confined in the wavelength-scale waveguide, its dispersion can inevitable be prone to intrinsic nanometer-scale fabrication errors, which can result in device-to-device deviations from the designed dispersion values.

Gate-Tunable Frequency Combs

The gated intracavity-tunability of graphene-based optical frequency combs can be achieved in many different ways in accordance with various embodiments of the invention. In many embodiments, the gate-tunable optical conductivity of graphene can be coupled onto a photonic resonator, allowing for the modulation of its second- and higher-order dispersions through the Fermi level. In some embodiments, the Fermi level of graphene can be tuned up to 0.65 eV while incorporated on an optical ring cavity by using a graphene-based dual-layer transistor with ionic liquid as the gate electric. In some embodiments, a microresonator can be enabled with widely gate-tunable group velocity dispersion ("GVD"), from anomalous to normal region (e.g., −62 fs$^2$/mm to 9 fs$^2$/mm), and a notable Q factor (up to $10^6$), which can be orders-of-magnitude higher than prior graphene-based studies. Consequently, the generation and dynamic operation of Kerr combs in a graphene chip can be achieved. In various embodiments, the formation of controllable primary comb lines from around 2.3 THz up to around 7.2 THz at −1.5 V gate voltages, the switchable formation of coherent Kerr frequency combs, and Cherenkov dispersive radiation with gate-controlled phase matching can all be achieved in a single microresonator. These can be measured with correlated optical spectra, RF spectra, and ultrafast second-harmonic optical autocorrelation. At a Fermi level of 0.59 eV, a phase-locked multi-soliton state with eight solitons per cavity round-trip can be achieved, deterministically formed and controlled by the gate voltage.

Figure 1B:
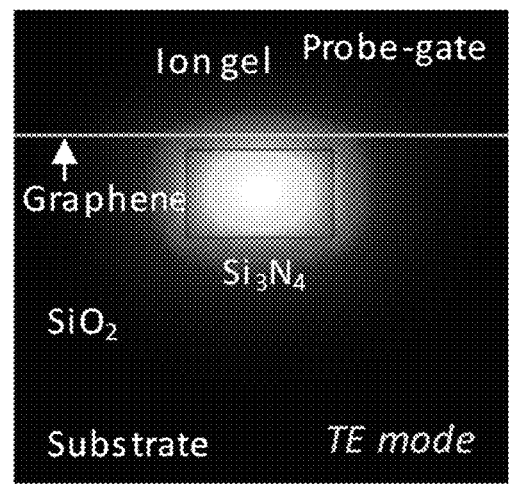
FIG. 1B shows a cross section electrical field distribution of a graphene microring resonator in accordance with an embodiment of the invention.

FIG. 1A conceptually illustrates the concept and fabrication of a graphene gate-tunable Kerr frequency comb with source-drain and top gating in accordance with an embodiment of the invention. As shown in the illustrative embodiment, a graphene/ion-gel heterostructure 100 can be incorporated in a nitride microresonator 102. In many embodiments, a high-Q silicon nitride microresonator is nanofabricated in a silicon foundry in a 350 μm diameter ring structure with measured loaded Q~$1.6 \times 10^6$ (intrinsic Q of ~$2 \times 10^6$) and free-spectral range ("FSR") of ~90 GHz. In some embodiments, the nitride core 102 can be fabricated to have a 1200×800 $nm^2$ cross-section, a 600 nm gap to the input-output coupling waveguide of 1000×800 $nm^2$ cross-section, and a top oxide cladding. In various embodiments, single atomic layer graphene 104 can be grown via chemical vapor deposition and transferred onto an exposed region of the nitride ring 102 (with etched $SiO_2$ window). A cross section electrical field distribution of a device in accordance with an embodiment of the invention is shown in FIG. 1B. In the illustrative embodiment, the device is fabricated to have a 1.2×0.8 $\mu m^2 Si_3N_4$ core. In some embodiments, the device can be fabricated such that graphene and the top gate probe are separated by ~1 μm with the interlayer ion-gel capacitor. The distance between the monolayer graphene and nitride core can be optimized to ~400 nm with a controlled top oxide cladding etch, enabling 8% of the $TE_{01}$ mode intensity evanescently overlapping the graphene electron-hole carriers and dispersion.

To ensure transparency and minimal effect on the resonator Q for coherent comb generation, the interacting graphene can be top-gated to pull the Fermi level up to 0.6 eV for reduced photon absorption in the nearly-massless Dirac cone. An ion-gel capacitor can be implemented on top of the graphene monolayer where the ionic liquid electric double layer provides a capacitance as high as ~7.2 $\mu F/cm^2$. This value can enable high doping control and comb tunability with a few-volt level gating. This can be important for sharp modulation on cavity and comb dispersion while keeping the cavity loss low. In several embodiments, the graphene-nitride gap can be optimized to 300 nm. In various embodiments, the planar graphene-nitride interaction arc length can be optimized to ~80 μm for a large frequency comb tunability with minimal graphene absorption losses. Further details on the nanofabrication and baseline characterization are described below in further detail.

Figure 1C:
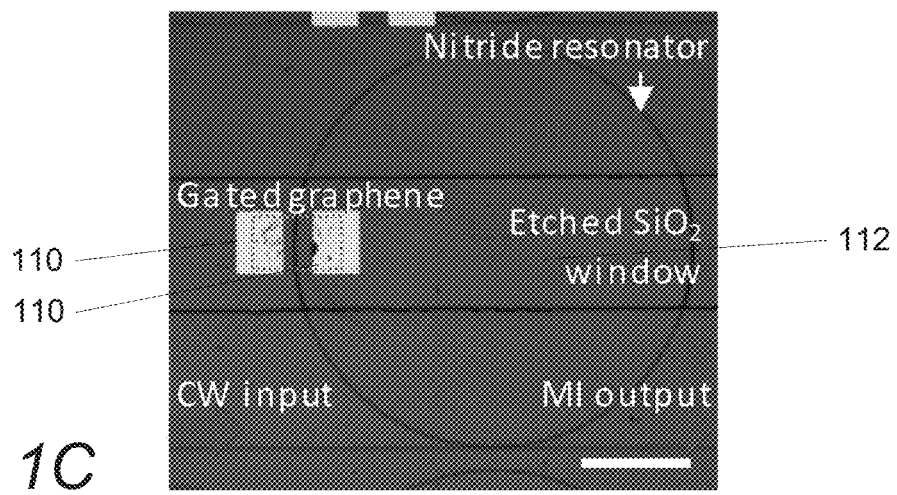
FIG. 1C shows a micrograph of a graphene microring resonator in accordance with an embodiment of the invention.
Figures 1D, 1E:
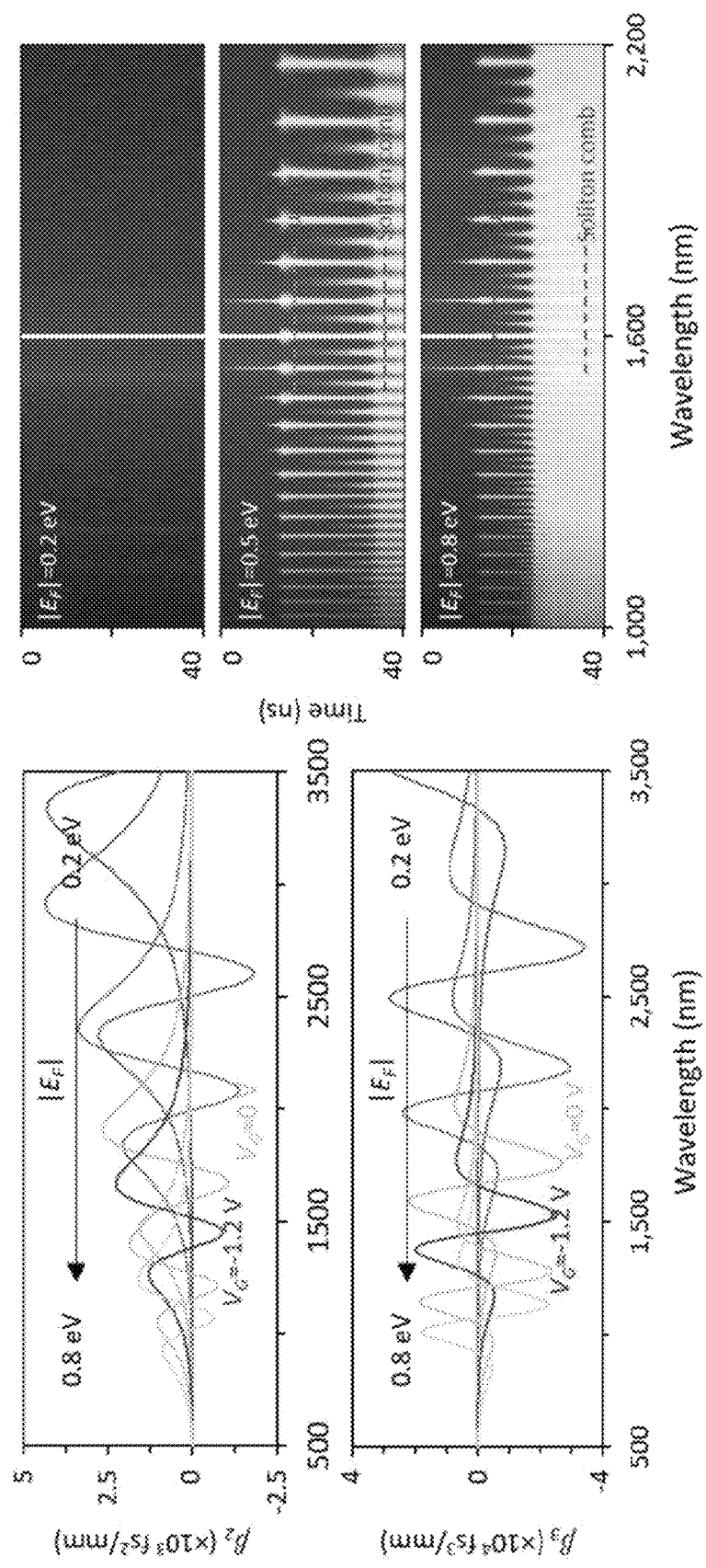
FIG. 1D shows calculated group-velocity-dispersion and third-order-dispersion of graphene in accordance with an embodiment of the invention.
FIG. 1E shows simulated Kerr comb dynamics in a graphene microring resonator in accordance with an embodiment of the invention.

FIG. 1C shows an optical micrograph depicting a bus waveguide 106, ring resonator 108, and Au/Ti metallized patterns 110 in accordance with an embodiment of the invention. An etched window 112 can be designed to ensure both the graphene-light interaction and a reduced propagation loss. FIG. 1D shows plots of the computed group velocity dispersion ($\beta_2$) and the computed third order dispersion ($\beta_3$) for tuned Fermi levels from 0.2 eV to 0.8 eV of a graphene monolayer in accordance with an embodiment of the invention. For each Fermi level, the wavelength-oscillations are noted in both $\beta_2$ and $\beta_3$, which can arise from the graphene carrier relaxation oscillation lifetime captured in the resonance of the monolayer sheet conductivity. As a result, the graphene $\beta_2$ can be tuned from anomalous to normal dispersion and then back to anomalous via gate voltage, which can be important for nonlinear phase-matching tunability. This can enable a wide and tunable frequency comb generation in a graphene microring resonator ("GMR"). Based on the modeled overall graphene $\beta_2$ and $\beta_3$, a heterogeneous microresonator can be modeled for Kerr frequency comb generation. FIG. 1E shows simulated Kerr comb dynamics as a temporal map in a GMR via the Lugiato-Lefever equation modeling, which can be determined by the Fermi level of the graphene, in accordance with an embodiment of the invention. As shown in the exemplary embodiment, at $E_F$ of 0.2 eV, the Q factor is low and hence there is no comb generation. At $E_F$ of 0.5 eV, the GMR has a Q~$8 \times 10^5$, $\beta_2$~−50 $fs^2$/mm and $\beta_3$~0, resulting in a slow comb generation. At $E_F$ of 0.8 eV, a fast full comb generation is observed numerically under a Q higher than $1 \times 10^6$, $\beta_2$~−30 $fs^2$/mm and $\beta_3$~−400 $fs^3$/mm.

Although the discussion above with respect to FIGS. 1A-1E describes graphene gate-tunable frequency combs with specific dimensions and observations, a person having ordinary skill in the art would appreciate that a graphene gate-tunable frequency comb can be fabricated with varying degrees in dimensions and characteristics.

Observations and Measurements of GMRs

Figure 2A:
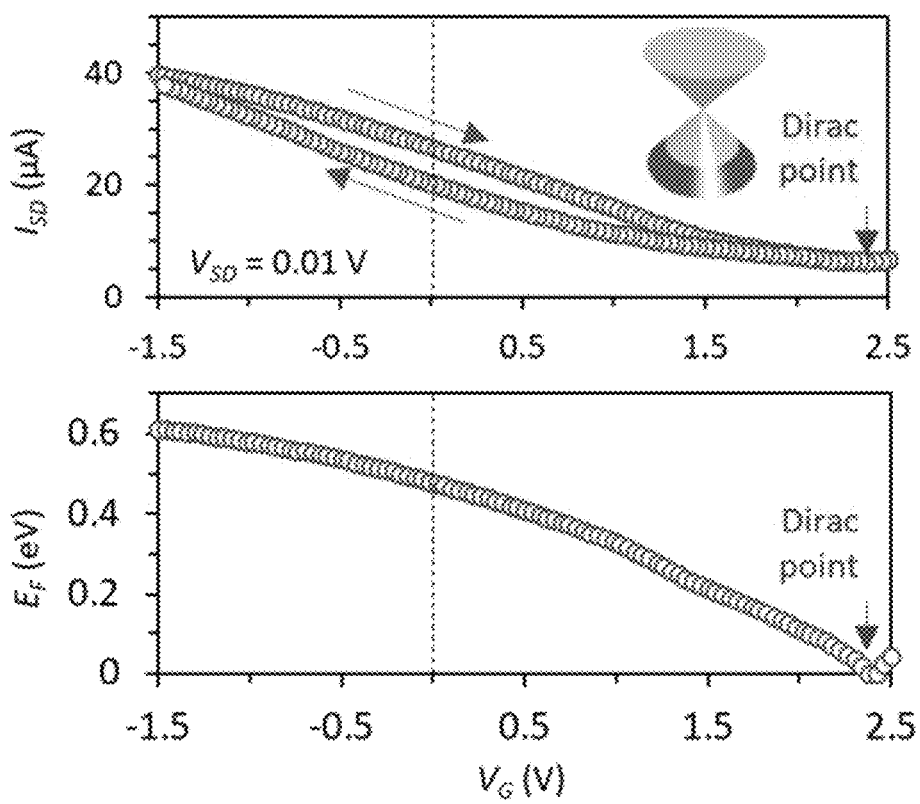
FIG. 2A shows an electronic measurement of a graphene/ion-gel capacitor in accordance with an embodiment of the invention.

FIG. 2A shows the electrical tuning performance of graphene in a GMR in accordance with an embodiment of the invention. With a fixed source-drain voltage $V_{SD}$ of 10 mV, the source-drain current $I_{SD}$ can be tuned with gate voltage $V_G$. In the exemplary embodiment, when $V_G$ reaches 2.4 V, $I_{SD}$ has a minimum of 6.5 μA. Here the carrier density of the graphene monolayer reaches the Dirac point. When $V_G$ is less than 2.4 V, graphene can be p-doped. In a cyclic $V_G$ tuning, a clear hysteresis loop can be observed due to the electronic trapping. Correspondingly, the gate-tunable Fermi energy $|E_F|$, $|E_F|=\bar{h}|v_F|(\pi N)^{-1/2}$ is plotted in the bottom panel of FIG. 2A. In the exemplary embodiment, $|E_F|$ is shown to be ~$(V_G)^{1/2}$. $V_G$ can be tuned in range of −2 V to 0 V, thereby controlling the graphene $|E_F|$ between 0.65 eV to 0.45 eV. For $V_G$=0 V, the graphene monolayer in the GMR can already be heavily doped, which can be significant for the dispersion tuning with a low loss.

Figure 2B:
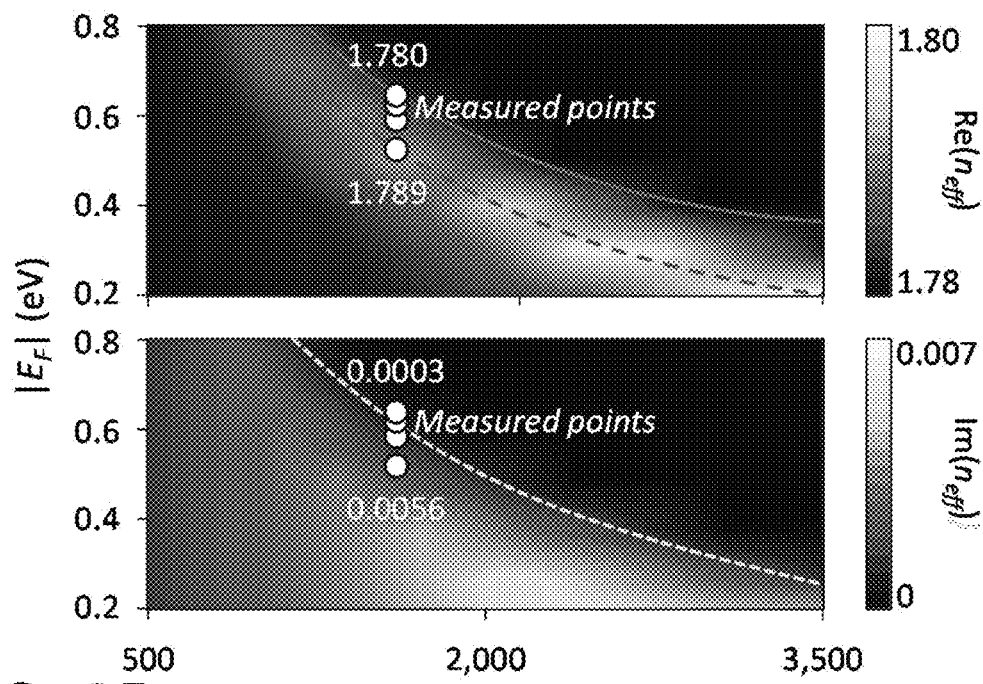
FIG. 2B shows theoretical predictions of the changes in the effective index of a graphene microring resonator in accordance with an embodiment of the invention.

FIG. 2B maps the calculated real and imaginary parts of a GMR varying with $|E_F|$ and wavelength λ in accordance with an embodiment of the invention. For the GMR, $n_{eff}$ can be determined by graphene permittivity $\varepsilon_G$={−−lm($\sigma_G$)+iRe($\sigma_G$)}/{2πfΔ}, where $\sigma_G$ is the graphene conductivity, f is the optical frequency, and Δ=0.4 nm is the thickness of the monolayer graphene. $\partial^n Re(n_{eff})/\partial \lambda^n$ refers to the nth order dispersion, while Im($n_{eff}$) refers the waveguide loss. In the two maps, the curves in the top panel denote the boundary where dispersion dramatically changes, and the curve in the bottom panel denotes the low loss region. In the exemplary embodiment, the measurements are taken by applying a high-power continuous-wave ("CW") pump at 1600 nm. At this wavelength, when the $|E_F|$ is tuned from 0.45 eV to 0.65 eV, $n_{eff}$ can be controlled from 1.789+0.058i to 1.781+0.001i.

Figure 2C:
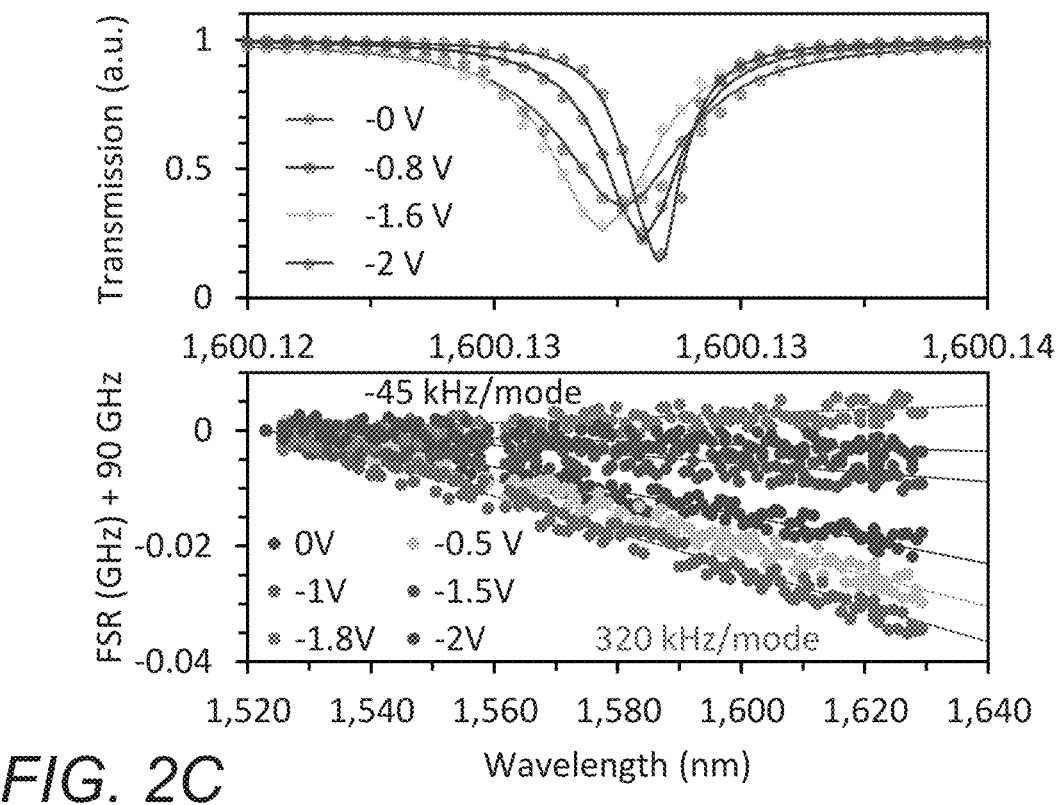
FIG. 2C shows measured transmissions and mode free-spectral range of a graphene microring resonator in accordance with an embodiment of the invention.

FIG. 2C shows the measured transmissions (top panel) and wavelength-FSR dependences (bottom panel) of a GMR under different gate voltages in accordance with an embodiment of the invention. In the exemplary embodiment, a broadband tunable laser serves as the light source with less than 10 mW, which is below the comb generation threshold. For a selected resonance around 1600 nm, when $V_G$ is tuned from 0 V to −2 V, the extinction ratio can increase from 63% to 84%, with resonance linewidth decreasing from 3.1 μm to 1.6 μm. Across the whole spectrum, the mode non-equidistance $D_{FSR}$ refers to GVD as $D_{FSR}=-\beta_2 c(2\pi f_{FSR})^2/n_{eff}$, where c is the light velocity in a vacuum. As shown, it is 320 kHz/mode under VG −1 V (anomalous dispersion) and −45 kHz/mode under $V_G$−1.8 V (normal dispersion).

Figure 2D:
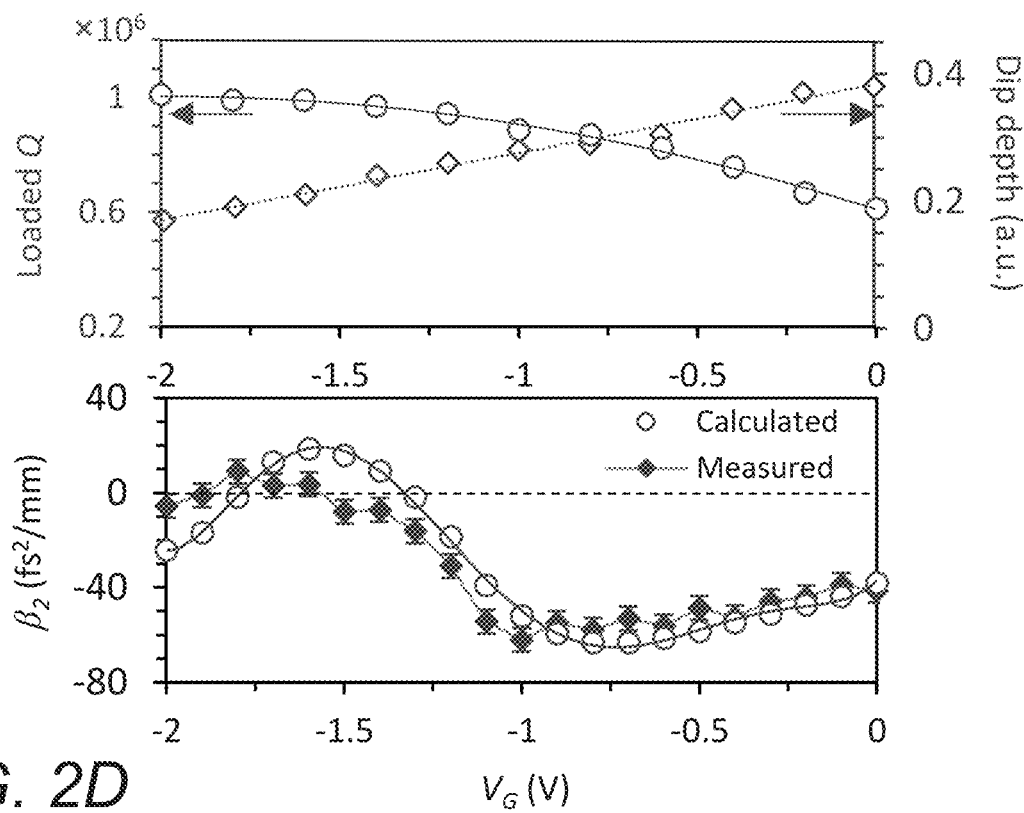
FIG. 2D shows tuned Q factor and dispersion a graphene microring resonator in accordance with an embodiment of the invention.

FIG. 2D shows the gate tuning performance of a GMR in accordance with an embodiment of the invention. Under gate voltages from 0 V to −2 V, Q factor of the GMR can increase from ~5×10⁵ to 10⁶, which can enable comb generation under a 1 W pump. Simultaneously, the dispersion of the resonator can be dynamically tuned, varying continuously from −62 fs²/mm anomalous dispersion to +9 fs²/mm normal dispersion.

Although FIGS. 2A-2D show measurements of specific GMRs, a person having ordinary skill in the art would appreciate that these measurements are taken from specific embodiments of the invention and are not representative of every embodiment of the invention.

Figure 3B:
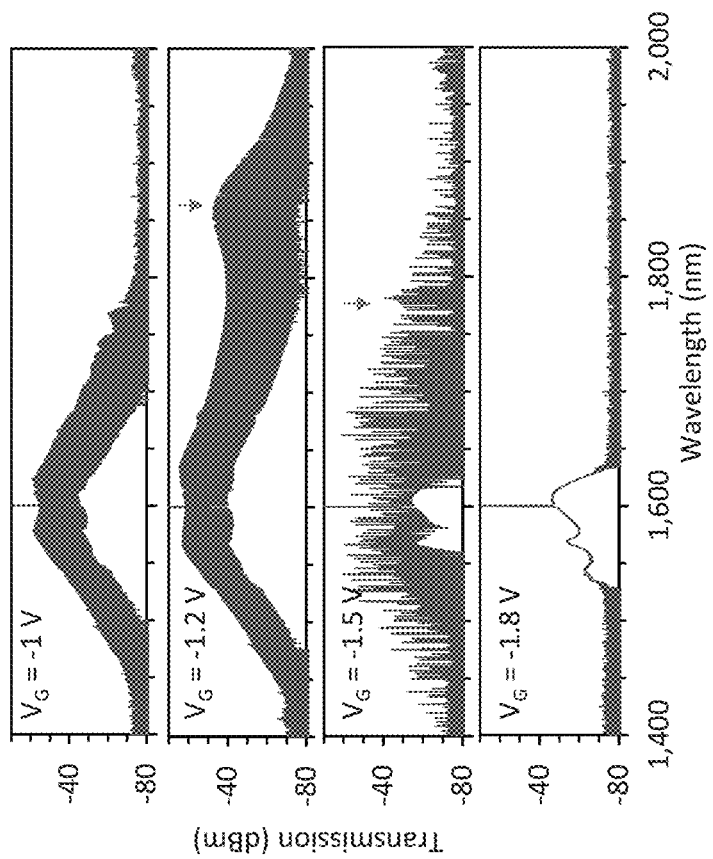
FIGS. 3A-3F show various observations of gate-tunable graphene Kerr frequency combs in accordance with many embodiments of the invention.
Figure 3A:
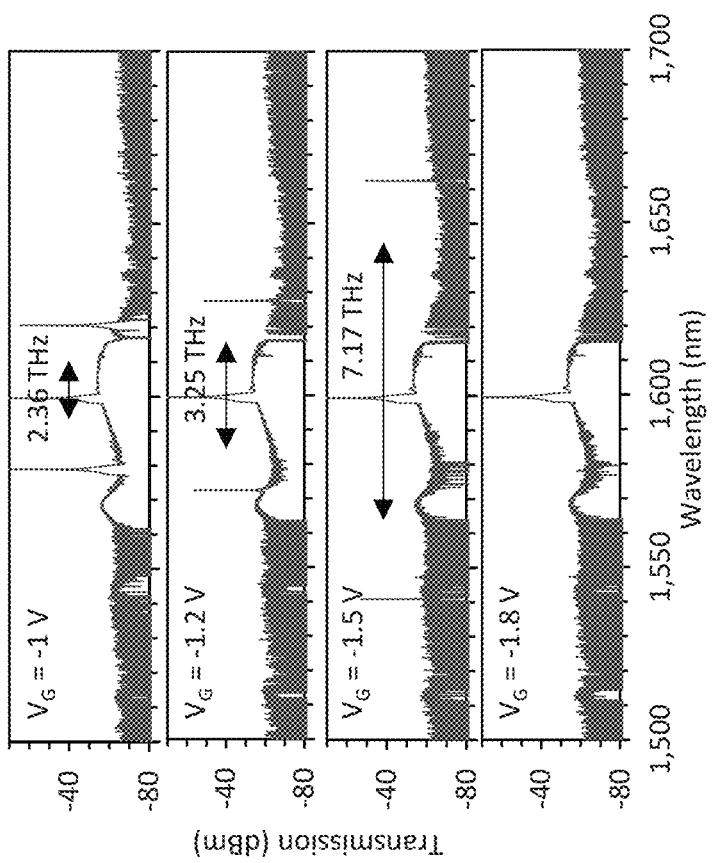

FIG. 3A shows primary comb lines at controlled gate voltages and Fermi levels of graphene in accordance with an embodiment of the invention. In the exemplary embodiment, for applied $V_G$=−1 V, −1.2 V, and −1.5 V, the measured frequency offset between the primary comb line and the pump $\Delta f_{pri}$, proportional to $(1/\beta_2)^{1/2}$ is observed at 2.36 THz, 3.25 THz, and 7.17 THz respectively. When $V_G$=−1.8 V, GVD of the GMR becomes positive and can therefore be harder for phase-matching without local mode-crossing-induced dispersion. FIG. 3B shows the optical spectra under carefully controlled laser-cavity detuning in accordance with an embodiment of the invention. Full frequency combs generated under gate voltages of −1 V, −1.2 V, −1.5 V, and −1.8 V are shown. In the exemplary embodiment, the launched pump power is fixed at 34.5 dBm, and Kerr combs are generated via fine-adjustment of the pump wavelength. In each controlled laser-cavity detuning conditions, the comb envelope and the Cherenkov peak are highlighted by using dashed curves. In the exemplary embodiment, at $V_G$=−1 V, GVD $\beta_2$~−62 fs²/mm while third-order-dispersion ("TOD") $\beta_3$~−9 fs³/mm, the Kerr comb has a span of ~350 nm, with a highly symmetrical shape. With $V_G$=−1.2 V, $\beta_2$~−33 fs²/mm while $\beta_3$~−630 fs³/mm, a frequency comb spectra spanning over 600 nm is observed, which is consistent with the general route of a smaller GVD bringing about a broader comb spectrum. The comb spectrum is highly asymmetric, with intensity contributions from Cherenkov radiation. The central spectral position of the Cherenkov radiation can be determined by $\beta_2/\beta_3$. In this case, the energy transfer can also be helpful to stabilize the frequency comb and generate Cherenkov solitons. Thirdly, when $V_G$=−1.5 V, $\beta_2$~−8 fs²/mm while $\beta_3$~−213 fs³/mm. Since $\beta_2$ here is quite small (less than 10 fs²/mm), it can be difficult to support a stable Kerr comb. Furthermore, in the exemplary embodiment, the observed comb lines are not even, and the Cherenkov peak in the spectral is also indistinguishable.

Figure 3C:
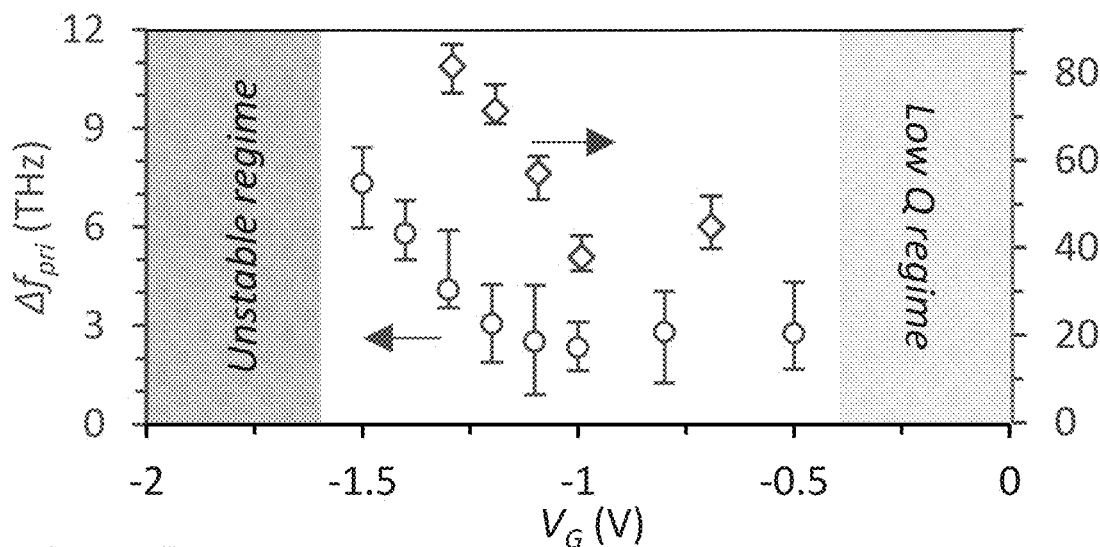
Figure 3D:
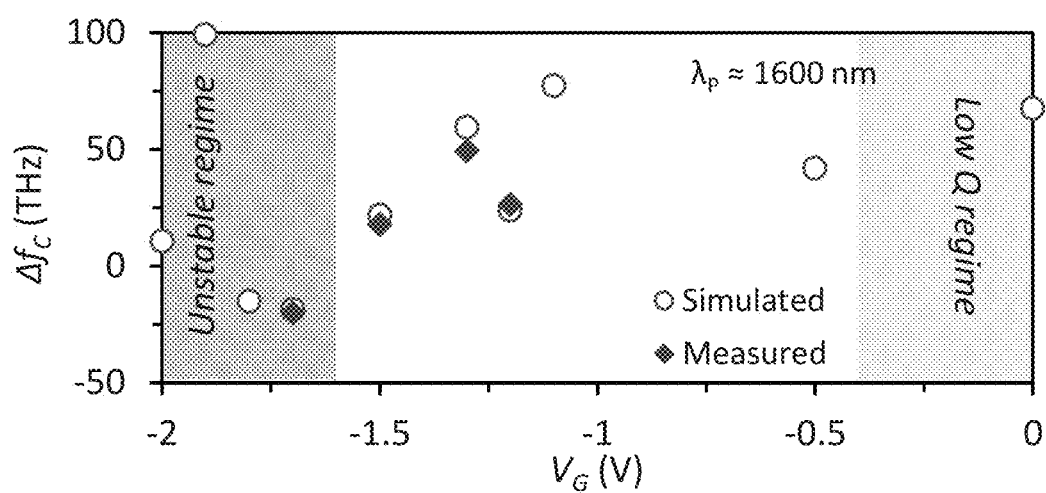

FIG. 3C summarizes the gate tunability of the graphene Kerr combs in accordance with an embodiment of the invention. $V_G$ ranging from 0 V to −2 V are shown. For primary comb lines, their relative spectral location $\Delta f_{pri}=|f_{pri}-f_{pump}|$ can be dramatically controlled (from 2.3 THz to 7.2 THz) with $V_G$ only from −1.0 V to −1.5 V respectively. This modulation matches the GVD engineering well and can be influenced by the slight nonlinearity enhancement brought by the graphene. For full-generated combs, FIG. 3C also demonstrates the electric-field control on their spectral span, across 38 THz to 82 THz with $V_G$ from −1.0 V to −1.3 V. Moreover, the gate-tuning can change the FSRs of the combs, from 89.6 GHz at −1.0 V to 89.9 GHz at −1.5 V. Such an optoelectronic tunability can enable different Kerr frequency combs with a variety of properties existing in the same device. FIG. 3D illustrates measured locations of Cherenkov peaks in comparison with computed designs in accordance with an embodiment of the invention. In contrast to the primary comb lines, the TOD can play an important role in the Cherenkov radiation. The spectral location of the Cherenkov peak can directly reflect the value of TOD. In the exemplary embodiment, three Cherenkov peaks are observed in the 1400 nm the 2000 nm window, with spectral locations $\Delta f_c=|f_c-f_{pump}|$ spanning from 26.3 THz ($V_G$=−1.2 V), 49.2 THz ($V_G$=−1.3 V), and 17.7 THz ($V_G$=−1.5 V). In the exemplary embodiments in FIGS. 3C and 3D, results are collected in the region of −0.4 V to −1.6 V since, when $V_G$ is more than −0.4 V, the Q factor of the GMR can be too low for comb generation and, when $V_G$ is less than −1.6 V, the GVD can be too small to ensure a stable comb.

Figure 3E:
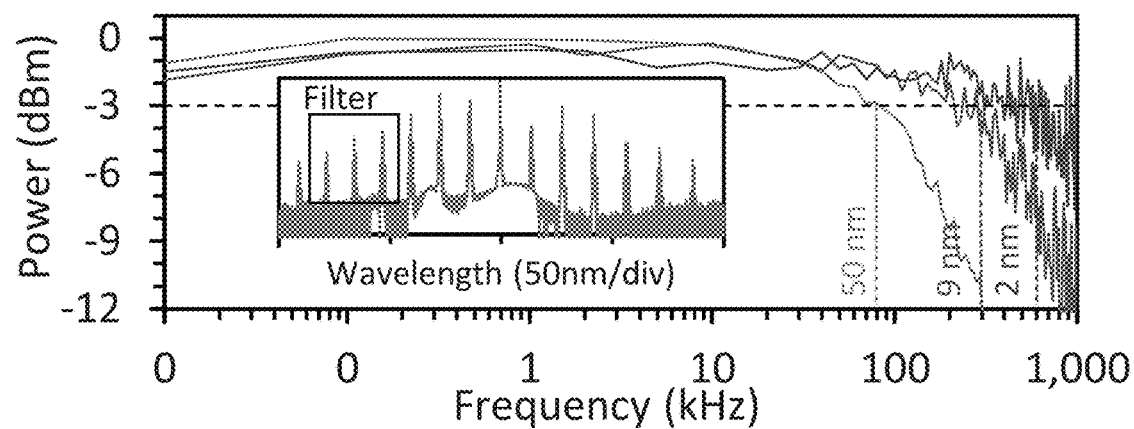

FIG. 3E shows an estimation of the modulation speed of a GMR in accordance with an embodiment of the invention. With $V_G$ tuning, the output comb line intensity within the filter window can be modulated temporally. The modulation speed can be bounded by ion diffusion in the heterostructure, large ion-gel capacitance on the graphene, and the optical filter bandwidth. In the illustrative embodiment, an ion-gel based capacitor was used to ensure $|E_F|$ is sufficiently high. The ion-gel based capacitor can have large capacitance (7.2 μF/cm2) and slow ion diffusion 10−10 m2/s) to limit the charge-discharge operation speed to less than hundreds of kHz. Optical filter bandwidth can be narrowed to improve the detection rate of the modulation by almost 7.5×, as shown in FIG. 3E. The modulated signal-to-noise ratio ("SNR") can be shown with an RF spectrum analyzer by using optical filters with passband width of 50 nm, 9 nm, and 2 nm. Corresponding bandwidths were 80 kHz, 200 kHz and 600 kHz, respectively. Although sub-MHz modulation for the primary comb can be successfully demonstrated, fast modulation while preserving the full-grown Kerr comb across the entire modulation cycle could be much more challenging: with $V_G$ tuning, not only the GVD, but also the FSR of the GMR is tuned. Compared to the primary combs shown in FIG. 3A, phase-matching of the full combs in FIG. 3B is more sensitive. A slight variation in the FSR from the gate modulation can cause the Kerr comb to collapse. To achieve reliable fast on-off switching in full-generated Kerr combs, inverse FSR compensation (e.g., via temperature feedback) can be be applied. Such a sub-MHz tunability for a Kerr comb could be potential in diverse applications such as tunable THz applications and precision measurements.

Figure 3F:
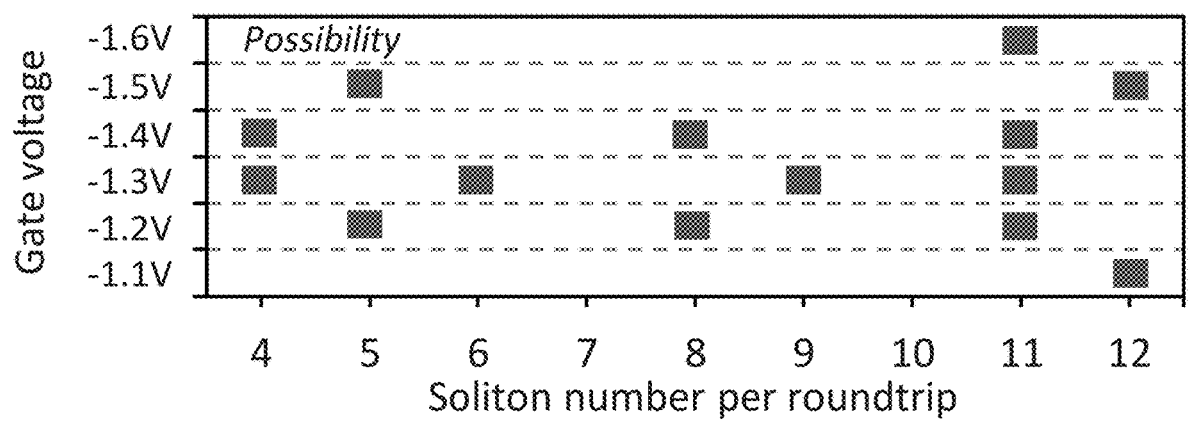

Dispersion is one of the most critical cavity parameter that defines the Kerr frequency comb dynamics. The significant broadband dispersion modulation, controlled by the gate voltage of the graphene-nitride heterogeneous microresonator, opens up the possibility of dynamically selecting the formation path of dissipative Kerr solitons and frequency combs. By using the gate tunable GMRs, we can engineer the dispersion dynamically for diverse soliton states formation via electrical control. With a fixed pump power of 2 W, FIG. 3F shows achieved soliton states in the measurements with the same experimental condition, when the gate voltage is in range of −1.6 V to −1.1 V. In total, soliton states with soliton number of 12, 11, 9, 8, 6, 5 and 4 can be found.

Figures 4A, 4B, 4C, 4D:
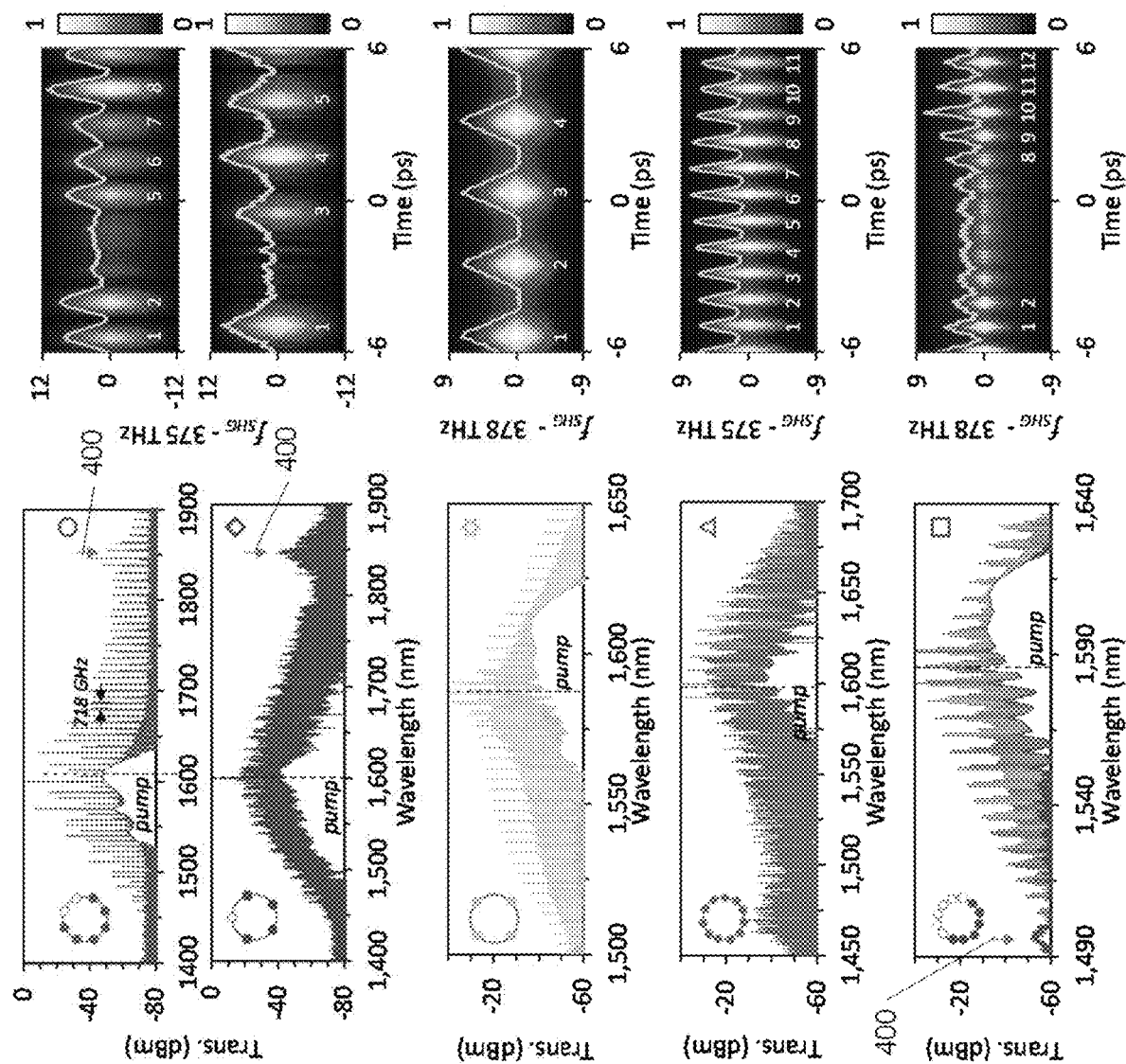
FIGS. 4A-4D conceptually illustrate four specific examples of the soliton crystal states under optimized gate voltages in accordance with various embodiments of the invention.

FIGS. 4A-4D conceptually illustrate four specific examples of the soliton crystal states under optimized gate voltages in accordance with various embodiments of the invention. In FIGS. 4A-4D, the left panels show the measured intensity transmission, the middle panels demonstrate the optical spectra, and the right panels illustrate the frame-by-frame frequency-resolved second-harmonic autocorrelation maps. These soliton states with low RF noise can be achieved following Turing patterns and chaotic states before transition into the soliton states. This can be characterized by transmission step, by tuning the pump laser gradually into the cavity resonance. FIG. 4A shows two examples of the soliton state with missing pulses, at a gate voltage $V_G$ of −1.2 V. The corresponding pump laser wavelength is around 1600.2 nm. The optical spectra of these states can be characterized by the apparent existence of groups of comb lines that are separated by multiple cavity FSRs. Within each comb group, weaker single-FSR comb lines are present and they can effectively connect all comb groups without any spectral gaps. For the examples shown on FIGS. 4A and 4D, the comb groups are separated by 8 FSR, 5 FSR and 12 FSR, respectively. In the time domain, the AC traces reveal the common features of missing pulses in the otherwise equally spaced soliton states with higher effective repetition rate. The self-organization of multiple soliton pulses into equally spaced soliton pulse train resembles the crystallization process, or termed a soliton crystal, and the missing pulse structure is analogous to defects in crystal lattices. Graphene-nitride heterogeneous microresonators in accordance with various embodiments of the invention thus can provide a platform for gate-voltage and Femi-level tunable study of the soliton physics. When the soliton crystals are formed, the emitted soliton Cherenkov radiations are sharp and narrow, marked by the arrows 400.

Soliton crystals can be formed due to the strong mode interaction and intra-cavity interferences, and thus their evolution dynamics can depend critically on the exact dispersion profile of the microresonator. By further optimizing the GVD and TOD via gate tuning, two periodic soliton crystal states can be demonstrated. FIG. 4B shows a 4-soliton state with $V_G$=−1.3 V and pump laser at 1584.2 nm, while FIG. 4C shows an 11-soliton state with $V_G$=−1.4 V and pump laser at 1600.1 nm. These soliton crystal states show remarkable stability and can robustly survive a significant pump power fluctuation up to ±2 dB, or wavelength offset up to ±300 μm. The soliton crystal formation is also akin to harmonic mode-locking where stable high-repetition-rate pulse train can be attained even in longer cavities, and it attracts interests in applications such as high-speed communication, comb spectroscopy, and data storage. This first realization of the charge-tunable graphene heterostructure for controllable frequency combs and soliton dynamics opens a new architecture at the interface of single atomic layer nanoscience and ultrafast optoelectronics.

Device Design and Fabrication

A microresonator can be fabricated in various dimensions using any of a variety of embodiments. In many embodiments, the microresonator can be fabricated to have a 1000×800 nm$^2$ cross-section bus waveguide and a 1200×800 nm$^2$ cross-section core for the ring. By using photolithography followed by buffered oxide etching, a SiO$_2$ window can be created above the ring and exposed Si$_3$N$_4$ waveguide, resulting in a distance between the core and air around 300 nm. A monolayer graphene can then be transferred onto the etched window, followed by photolithography patterning and oxygen plasma etching. The graphene layer can be grown by chemical vapor deposition method on copper substrate and transferred using wet transfer technique. The monolayer graphene can be lithographically cut into an 80×100 μm$^2$ sheet. Next, source-drain electrodes (Ti/Au, 20/50 nm) can be deposited and patterned using electron-beam evaporation and electron-beam lithography. In some embodiments, the pad size is 80 μm×60 μm. Subsequently, ionic liquid [DEME-TFSI (N,N-diethyl-Nmethyl-N-(2-methoxyethyl)ammonium bis(trifluoromethylsulfonyl) imide, from Sigma-Aldrich] can be integrated as the gate dielectric, resulting in an electric dual-layer graphene transistor.

Q Factor and Dispersion Measurement

The microring resonator transmission can be measured using a tunable laser swept through its full wavelength tuning range at a speed of 40 nm/s. Accordingly, dispersion and Q factors can be measured. For accurate wavelength calibration, 1% of the laser output can be directed into a fiber coupled hydrogen cyanide gas cell (HCN-13-100, Wavelength References Inc.). The microring resonator and gas cell transmission can be recorded during the laser sweep by a data acquisition system through an unbalanced fiber Mach-Zehnder Interferometer (MZI). The MZI has an approximately 40 m path length difference, ensuring the measurement optical frequency sampling resolution of 5 MHz. Each resonance can be fitted with a Lorentzian lineshape unless a cluster of resonances are deemed too close to achieve a conclusive fit with a single Lorentzian. Then, an N-Lorentzian fit can be utilized, where N is the number of resonances being fitted. The dispersion of the ring resonator can be determined by analyzing the wavelength dependence of the FSR. In some embodiments, the microring resonator chip is gated by a probe.

Heterodyne and Autocorrelation

To measure the stability and soliton states of a frequency comb, a wavelength-division multiplexer ("WDM") can be used to divide the C-band comb lines (1530 nm to 1570 nm) and the L-band comb lines (1570 nm to 1630 nm) with the pump laser. The 1570 nm to 1630 nm window can be monitored by an optical spectrum analyzer ("OSA") (Advantest AQ8384). A stable CW laser with narrow linewidth (300 kHz, New Focus) can be applied as the heterodyne reference or the 1530 nm to 1570 nm beatnotes. A polarization controller can be used to optimize the input polarization. The beatnotes can be measured by a 3 GHz RF electric spectrum analyzer ("ESA") (Agilent CXA 9000A). The comb signal can also be measured in the time-domain, by using sensitive autocorrelator. For the autocorrelation, a section of '7 m DCF+15 m SMF' can be used to compensate the GVD, avoiding the pulse broadening.

Although specific gate-tunable frequency combs are discussed above, many different optical frequency combs can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A microresonator comprising:
a silicon nitride ring cladded with silicon dioxide, wherein the silicon oxide defines a window above a region of the silicon nitride ring;
a bus waveguide coupled to the silicon nitride ring;
a graphene ion-gel heterostructure disposed within the window above the region of the silicon nitride ring, wherein the graphene/ion-gel heterostructure comprises:
 a graphene monolayer;
 source-drain electrodes integrated on the graphene monolayer; and
 a layer of ionic liquid used as a gate dielectric;
wherein the microresonator is configured to form a frequency comb tunable through the modulation of the dispersion of the microresonator.

2. The microresonator of claim 1, wherein the modulation of the intracavity dispersion is achieved through the tuning of the Fermi level of the graphene monolayer using an applied gate voltage.

3. The microresonator of claim 2, wherein the Fermi level of the graphene monolayer can be tuned from about 0.45 eV to about 0.65 eV.

4. The microresonator of claim 2, wherein the dispersion of the microresonator can be tuned from about $-62$ fs$^2$/mm anomalous dispersion to about $+9$ fs$^2$/mm normal dispersion through tuning the gate voltage from about $-2$ V to about 0 V.

5. The microresonator of claim 2, wherein the microresonator is configured to form a frequency comb having a relative spectral location that is tunable from about 2.3 THz to about 7.2 THz.

6. The microresonator of claim 2, wherein the microresonator is configured to form a frequency comb having a relative spectral location that is tunable from about 2.3 THz to about 7.2 THz by tuning the applied gate voltage from about $-1$ V to about $-1.5$ V.

7. The microresonator of claim 1, wherein a fixed source-drain voltage of 10 mV is applied to the graphene ion-gel heterostructure.

8. The microresonator of claim 1, wherein the microresonator is capable of achieving multi-soliton states.

9. The microresonator of claim 1, wherein the microresonator is capable of achieving soliton states with soliton numbers of 12, 11, 9, 8, 6, 5, and 4.

10. The microresonator of claim 1, wherein the microresonator has a loaded quality factor of about $1.6 \times 10^6$.

11. The microresonator of claim 1, wherein the source-drain electrodes comprise Ti/Au.

12. The microresonator of claim 1, wherein the ionic liquid comprises diethylmethyl(2-methoxyethyl)ammonium bis(trifluoromethylsulfonyl)imide.

13. The microresonator of claim 1, wherein the layer of ionic liquid provides a capacitance of about 7.2 µF/cm$^2$.

14. The microresonator of claim 1, wherein the graphene monolayer is disposed about 100 nm away from the silicon nitride ring.

15. The microresonator of claim 1, wherein the graphene monolayer is disposed about 300 nm away from the silicon nitride ring.

16. The microresonator of claim 1, wherein the graphene monolayer and the silicon nitride ring have a planar interaction arc length of about 80 µm.

17. The microresonator of claim 1, wherein the silicon nitride ring has a cross section of about 1200 nm×800 nm.

18. The microresonator of claim 1, wherein the silicon nitride ring has a diameter of about 350 µm.

19. The microresonator of claim 1, wherein the bus waveguide has a cross section of about 1000 nm×800 nm.

20. The microresonator of claim 1, wherein the bus waveguide is disposed about 600 nm away from the silicon nitride ring.

* * * * *